L. IVERSEN.
COUPLING DEVICE.
APPLICATION FILED JUNE 8, 1909.
942,780.
Patented Dec. 7, 1909.
2 SHEETS—SHEET 1.
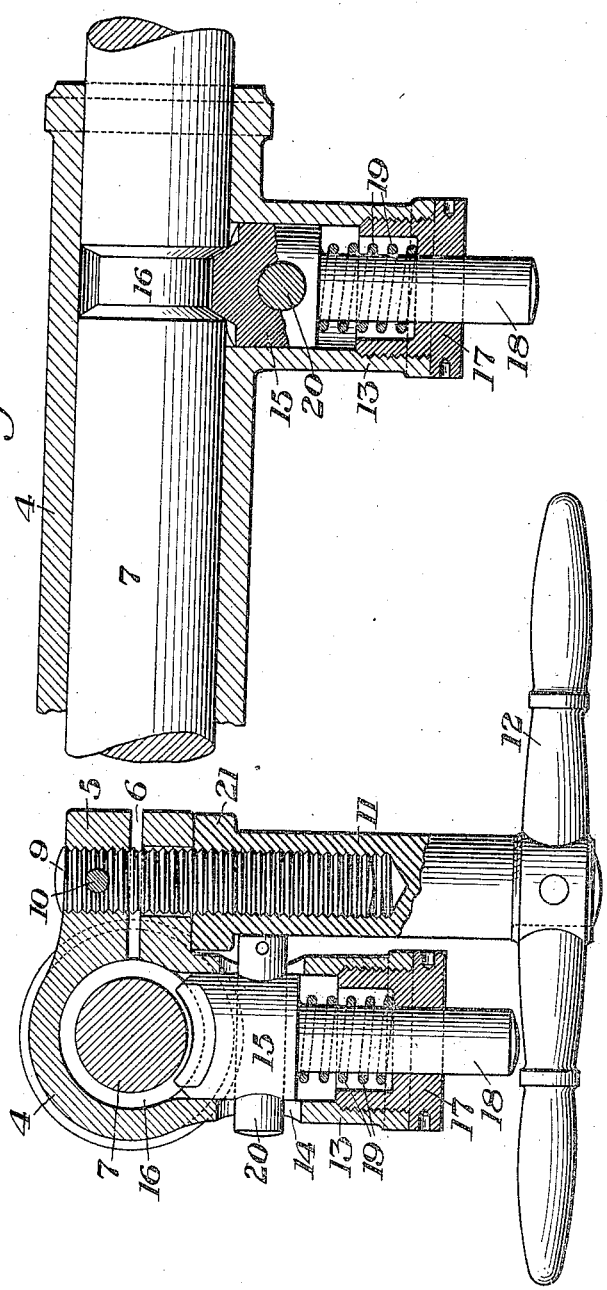
WITNESSES
R A Balderson
G L Winters
INVENTOR
L. Iversen
by Bakewell, Byrnes & Parmelee
his Attys L. IVERSEN.
COUPLING DEVICE.
APPLICATION FILED JUNE 8, 1909.
942,780.
Patented Dec. 7, 1909.
2 SHEETS—SHEET 2.
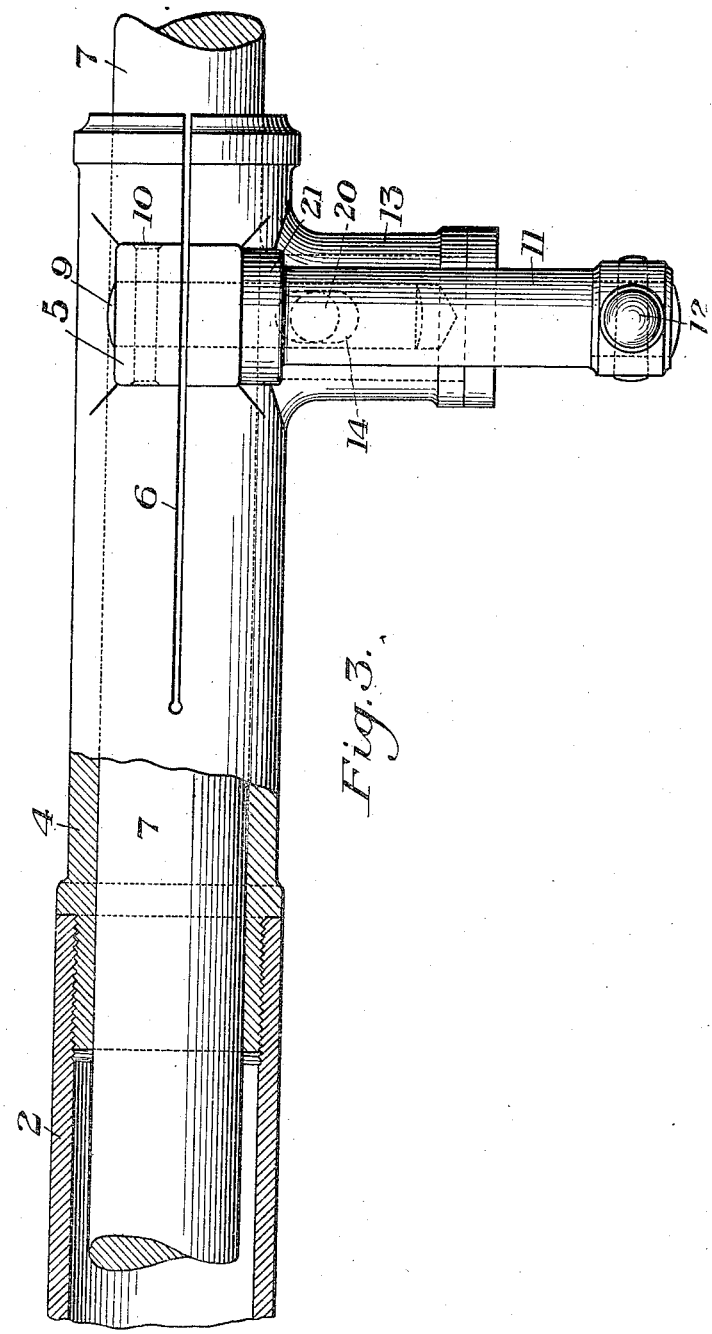
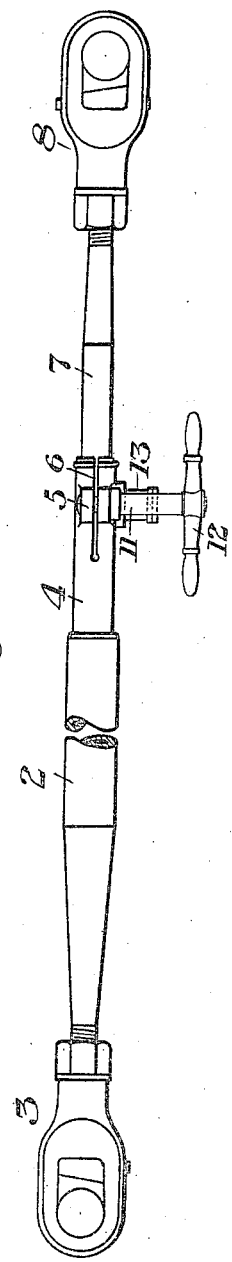
WITNESSES
INVENTOR

UNITED STATES PATENT OFFICE.

LORENZ IVERSEN, OF WEST HOMESTEAD, PENNSYLVANIA, ASSIGNOR TO MESTA MACHINE COMPANY, OF PITTSBURG, PENNSYLVANIA, A CORPORATION OF PENNSYLVANIA.

COUPLING DEVICE.

942,780.  Specification of Letters Patent.  Patented Dec. 7, 1909.

Application filed June 8, 1909. Serial No. 500,925.

*To all whom it may concern:*

Be it known that I, LORENZ IVERSEN, of West Homestead, Allegheny county, Pennsylvania, have invented a new and useful Improvement in Coupling Devices, of which the following is a full, clear, and exact description, reference being had to the accompanying drawings, forming part of this specification, in which—

Figure 1 is a transverse section of one form of device embodying my invention; Fig. 2 is a longitudinal section of a portion of the device; and Fig. 3 is a view partly in elevation and partly in section; and Fig. 4 is an elevation showing the coupling device applied to a valve gearing.

My invention has relation to coupling devices, and is designed to provide a simple and convenient form of coupling which can be used for a variety of purposes, but which has been more particularly designed as a means for connecting and disconnecting the driving mechanism of an engine from the valve gear to permit the valve gear to be operated by hand independently of the movement of the machine.

The invention is also designed to provide a device of this character by means of which the driving rod may be rigidly clamped after the rod and sleeve members of the coupling are in their relatively correct positions, but which will prevent the clamping of the sleeve to the rod in any incorrect position.

The precise nature of my invention will be best understood by reference to the accompanying drawings, in which I have shown the preferred form thereof as applied to a valve gearing, and which will now be described, it being premised, however, that various changes can be made in the details of construction and arrangement of the parts without departing from the spirit and scope of my invention as claimed.

In these drawings, the numeral 2 designates a sleeve, which is connected at one end to the driving part 3 of the valve gear of the engine. This sleeve has a section 4 screwed into its opposite end, said section being formed with a projecting lug 5, and the section having a longitudinal slit or slot 6 cut therein and extending through the lug 5.

7 is a rod which is connected to the driven member 8, and which telescopes within the clamping section 4 of the sleeve 2, as shown in Fig. 3.

9 is a threaded clamping bolt extending through the split lug 5, said bolt being secured by a pin 10 or other suitable means in one of the sections of said lug, as shown in Fig. 1, and having its projecting end, which passes through the other sections of the lug engaged by a sleeve nut 11 having an operating handle 12. The split sleeve section 5 is also provided with the hollow extension 13 having a slot 14 extending therethrough, and forming a seat for a latch member 15 whose inner end projects into the body of the sleeve section and is arranged to engage a circumferential groove 16 in the rod 7, as shown in Fig. 2. The outer end of the extension 13 is closed by a nut 17 having an aperture therethrough which guides the stem 18 of the latch member. Said nut also forms a seat for a spring 19, which bears against the head of the latch member and tends to press it into engagement with the rod.

20 is a pin which extends through the latch member with its ends projecting through the slots 14, one of said projecting ends being arranged to be engaged by a head 21 on the sleeve nut 11.

The operation is as follows:—By turning the handle 12 in a direction to back the sleeve nut 11 away from the split lug 5, the latch member is drawn out of the groove 16 by the engagement of the head 21 of said nut with the projecting end of the pin 20, and the clamping action of the sleeve section on the rod is also released. This leaves the telescopic rod free to slide in the sleeve so that the valve gear can be operated by hand for any desired purpose. When it is again desired to connect the rod rigidly with the sleeve and in turn with the driving member of the mechanism, the sleeve nut 11 is screwed up by means of the handle 12, leaving the spring 19 free to hold the latch member against the rod at any point on the rod where the rod may happen to be in the sleeve. The handle 12 is turned until it strikes the outer end of the stem 18 of the latch member, the said outer end acting as a stop which will prevent the nut from being turned any farther at this time. This prevents clamping of the sleeve section on the rod at this time, since the rod may be at the wrong place. In this position the head 21 will be out of contact with the pin 20, so that the latch will be free to slip into the groove 16 in the rod whenever the rod is moved to bring the groove opposite the latch member. When the latch member is forced by the spring into engagement with this groove, it leaves the handle 12 free for a further movement. Said handle is then turned, and forces together the sections of the split lug, thereby positively clamping the rod in the sleeve section.

The advantages of my invention result from the provision of the simple coupling device described, which can be readily operated to connect or disconnect two telescoping members; and which is so constructed and arranged that the members cannot be clamped to each other except in the proper relation.

It will be obvious that various changes may be made in the details of construction and arrangement of the parts without departing from the invention. Thus, the latch member may be of different forms, and may be differently seated; and other changes may be made.

I claim:—

1. In a device of the character described, the combination of two telescoping members, a spring-pressed latch device carried by one of said members and arranged to engage the other member, and a clamping device for clamping the two members rigidly together, said clamping device having means for releasing the latch member; substantially as described.

2. In a device of the character described, the combination of two telescoping members, the outer member consisting of a sleeve having a split portion, a clamping device for clamping the split portion of the sleeve upon the other member, a latch device carried by said sleeve and arranged to engage the other member, and means whereby the release of the clamping device releases the latch device; substantially as described.

3. In a device of the character described, a split sleeve section, a rod telescoping said section and having a recess therein, a spring-pressed latch carried by the sleeve section and arranged to engage the recess in the rod, and a clamping device for the sleeve section, said clamping device having means for engaging the latch member to release the same; substantially as described.

4. In a device of the character described, a split sleeve section, a rod telescoping said section and having a recess therein, a spring-pressed latch carried by the sleeve section and arranged to engage the recess in the rod, a clamping device for the sleeve section, said clamping device having means for engaging the latch member to release the same, and a latch member having an extension forming a stop for the clamping device; substantially as described.

5. In a device of the character described, a rod, a split sleeve section telescoping over the rod, a clamping bolt and nut for said sleeve, and a spring-pressed latch member carried by the sleeve and arranged to engage a recess in the rod, said latch member and nut having portions adapted to engage with each other to effect the release of the latch, and also having portions coöperating to form a stop for the nut; substantially as described.

In testimony whereof, I have hereunto set my hand.

LORENZ IVERSEN.

Witnesses:
C. J. MESTA,
F. J. WALDSCHUTZ.